(12) United States Patent
Zhang et al.

(10) Patent No.: US 8,272,222 B2
(45) Date of Patent: Sep. 25, 2012

(54) INLET BLEED HEAT SYSTEM WITH EJECTOR/MIXER NOZZLES FOR NOISE REDUCTION

(75) Inventors: Hua Zhang, Greenville, SC (US); David Wesley Ball, Greenville, SC (US)

(73) Assignee: General Electric Company, Schenectady, NY (US)

( * ) Notice: Subject to any disclaimer, the term of this patent is extended or adjusted under 35 U.S.C. 154(b) by 391 days.

(21) Appl. No.: 12/651,585

(22) Filed: Jan. 4, 2010

(65) Prior Publication Data
US 2011/0162383 A1 Jul. 7, 2011

(51) Int. Cl.
*F02G 3/00* (2006.01)
*F02C 6/04* (2006.01)
(52) U.S. Cl. ........................ 60/785; 60/39.093
(58) Field of Classification Search .............. 60/782, 60/784, 785, 795, 39.093, 39.091, 725; 244/134 R
See application file for complete search history.

(56) References Cited

U.S. PATENT DOCUMENTS

| | | | |
|---|---|---|---|
| 5,157,916 A | 10/1992 | Wynosky et al. | |
| 5,560,195 A * | 10/1996 | Anderson et al. | 60/785 |
| 5,761,900 A | 6/1998 | Presz, Jr. | |
| 6,082,635 A * | 7/2000 | Seiner et al. | 239/265.19 |
| 2007/0256420 A1* | 11/2007 | Schott et al. | 60/772 |

* cited by examiner

*Primary Examiner* — William H Rodriguez
*Assistant Examiner* — Gerald Sung
(74) *Attorney, Agent, or Firm* — Nixon & Vanderhye P.C.

(57) ABSTRACT

An inlet bleed heat system in a gas turbine includes a compressor discharge extraction manifold that extracts compressor discharge air, an inlet bleed heat manifold receiving the compressor discharge air, and a plurality of acoustic dispersion nozzles disposed at an output end of the inlet bleed heat manifold that reduce a velocity of the compressor discharge air in the inlet bleed heat manifold. Noise is generated from the shearing action between the surrounding atmosphere and air jets from orifices. When the air jet velocity is slowed using, for example, a multi-stage ejector/mixer, noise can be abated.

8 Claims, 4 Drawing Sheets

INLET BLEED HEAT SYSTEM WITH EJECTOR/MIXER NOZZLES FOR NOISE REDUCTION

BACKGROUND OF THE INVENTION

The invention relates to noise reduction in a gas turbine and, more particularly, to the use of a multiple stage ejector/mixer nozzle in a gas turbine inlet bleed heat application to reduce noise.

The combustion system of a gas turbine generates hot gases to drive a turbine. The turbine, in turn, drives a compressor that provides compressed air for combustion in the combustion system. The turbine produces usable output power.

In some gas turbine applications, there are instances of gas turbine plant operation where the gas turbine pressure ratio reaches the operating pressure ratio limit of the compressor, resulting in compressor surge. These instances may arise in applications where low BTU fuels or any other fuels with large amounts of diluent injection are used and/or at cold ambient temperature conditions. The compressor pressure ratio is typically larger than the turbine pressure ratio in that the latter is subject to pressure loss in the turbine combustor.

One common solution that has been used to provide compressor pressure ratio protection is the bleeding off of gas turbine compressor discharge air and recirculating the bleed air back to the compressor inlet. This method of gas turbine operation, known as Inlet Bleed Heat (IBH) Control, raises the inlet temperature of the compressor inlet air by mixing the colder ambient air with the bleed portion of the hot compressor discharge air, thereby reducing the air density and the mass flow to the gas turbine.

When a gas turbine bleeds compressor air into the inlet duct, it creates noise that can exceed noise limits. Existing designs place the bleeding manifolds downstream of inlet silencing panels. This arrangement can address an icing problem of the compressor IGV, but does not sufficiently solve the problem of inlet filter housing icing. If the bleeding manifolds are placed before the silencers in the inlet duct to address the icing problem, the noise problem arises.

A silencing nozzle was proposed for an IBH system. Silencing nozzles, however, are expensive. A related problem has been addressed in aircraft engine technology, using an ejector/mixer nozzle to reduce aircraft engine noise. The noise results from shearing action between the surrounding atmosphere and air jets from orifices. After a multi-stage ejector/mixer, the jet velocity is slowed down significantly, thereby reducing noise. There is currently no similar technology to reduce noise in a gas turbine.

It would thus be desirable for an IBH system to include an ejector/mixer noise reduction nozzle to enhance the mixing of hot air in the turbine without the use of expensive components.

BRIEF DESCRIPTION OF THE INVENTION

In an exemplary embodiment, an inlet bleed heat system in a gas turbine includes a compressor discharge extraction manifold that extracts compressor discharge air, an inlet bleed heat manifold receiving the compressor discharge air, an inlet filter housing disposed upstream of the inlet bleed heat manifold, and an inlet silencer disposed downstream of the inlet bleed heat manifold. A plurality of acoustic dispersion nozzles are disposed at an output end of the inlet bleed heat manifold and between the inlet filter housing and the inlet silencer. The acoustic dispersion nozzles serve to reduce a velocity of the compressor discharge air in the inlet bleed heat manifold by mixing the compressor discharge air with outside air from the inlet filter housing.

In another exemplary embodiment, an inlet bleed heat system in a gas turbine includes a compressor discharge extraction manifold that extracts compressor discharge air, an inlet bleed heat manifold receiving the compressor discharge air, and a plurality of acoustic dispersion nozzles disposed at an output end of the inlet bleed heat manifold that reduce a velocity of the compressor discharge air in the inlet bleed heat manifold.

In yet another exemplary embodiment, a method for reducing noise in an inlet bleed heat system of a gas turbine includes the steps of extracting compressor discharge air; directing the compressor discharge air into an inlet bleed heat manifold; and reducing a velocity of the compressor discharge air in the inlet bleed heat manifold by mixing the compressor discharge air with outside air via an inlet filter housing.

DETAILED DESCRIPTION OF THE INVENTION

Figure 1:
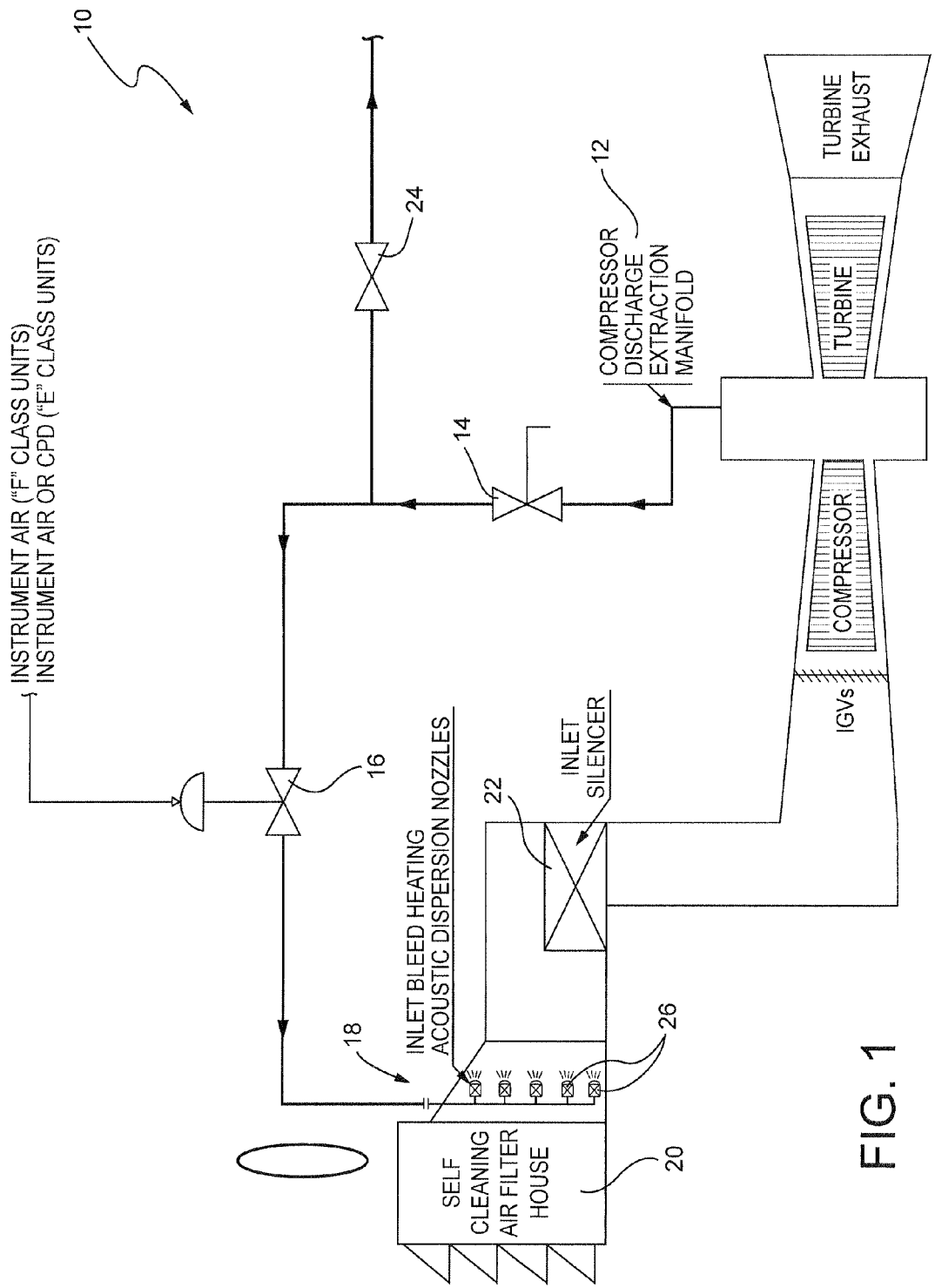
FIG. 1 is a schematic illustration of a gas turbine including an inlet bleed heat system.

Referring to FIG. 1, an inlet bleed heat system 10 is schematically illustrated. Inlet bleed heat (IBH) is typically used to protect the gas turbine compressor from icing when operating at reduced IGV angles. Moreover, IBH systems are used to reduce compressor pressure ratio at certain operating conditions where additional compressor operating margin is required. As illustrated, a compressor discharge extraction manifold 12 is provided for extracting compressor discharge air, which flows through a manual isolation valve 14 and a control valve 16 to an inlet bleed heat manifold 18 disposed downstream of an inlet air filter housing 20 and an inlet silencer 22. In the illustrated system, a drain valve 24 is provided for diverting condensate.

Figure 2:
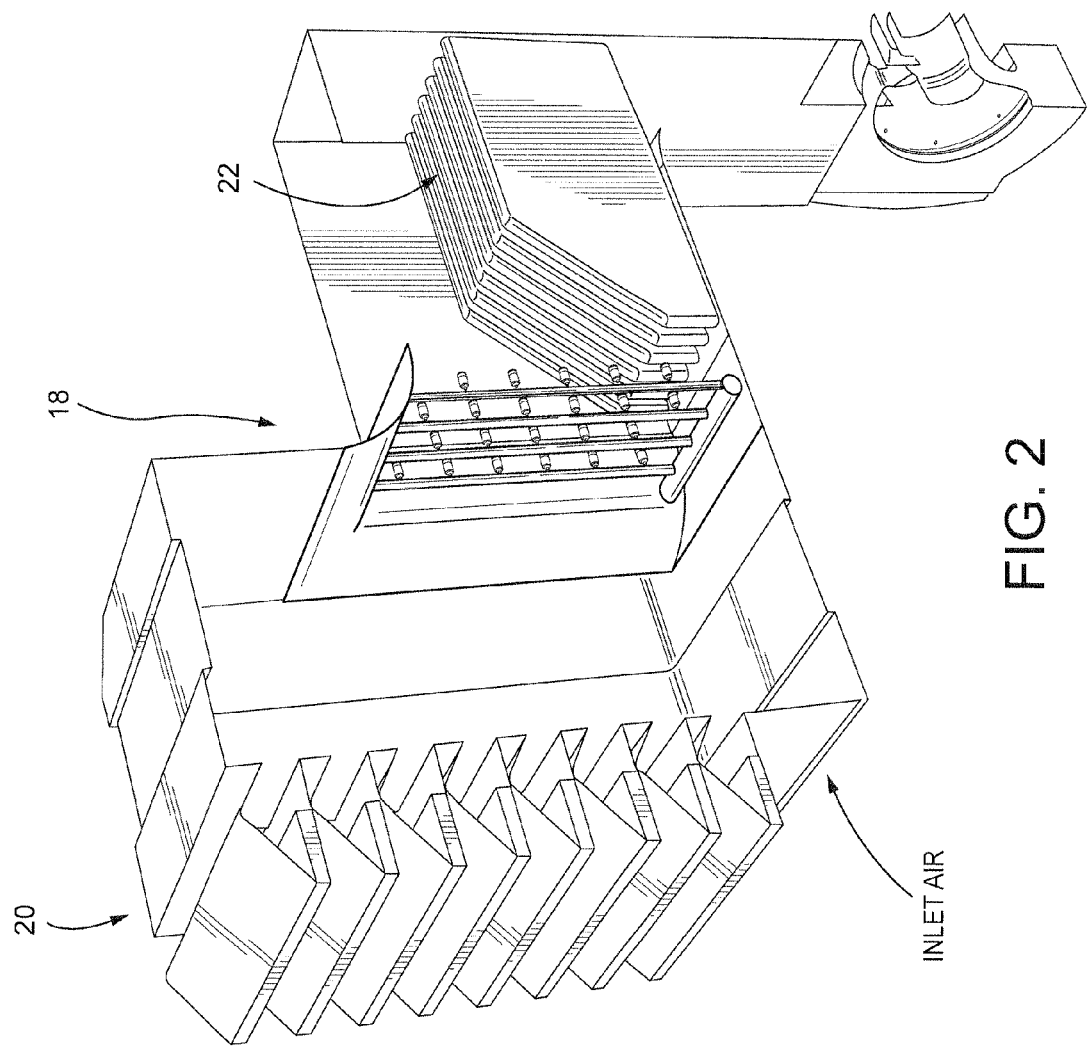
FIG. 2 is a perspective view showing a position of ejector/mixer nozzles between the inlet filter and an inlet silencer.
Figure 3:
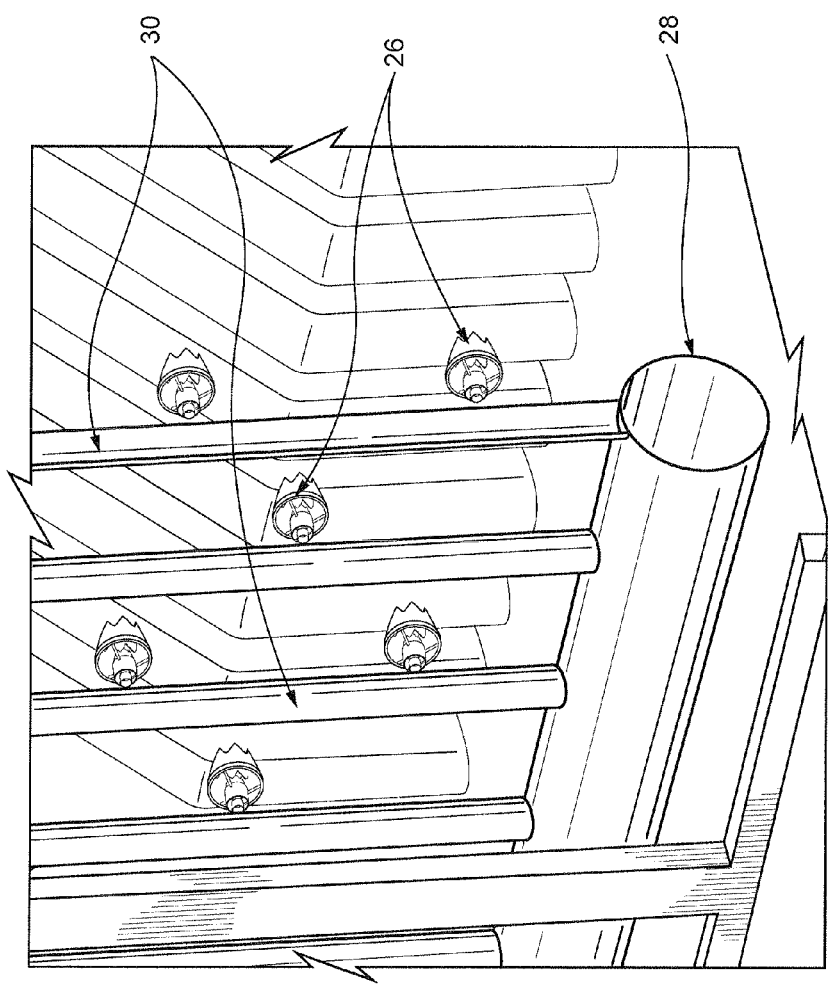
FIG. 3 is a close-up view of the inlet bleed heat manifold shown in FIG. 2.
Figure 4:
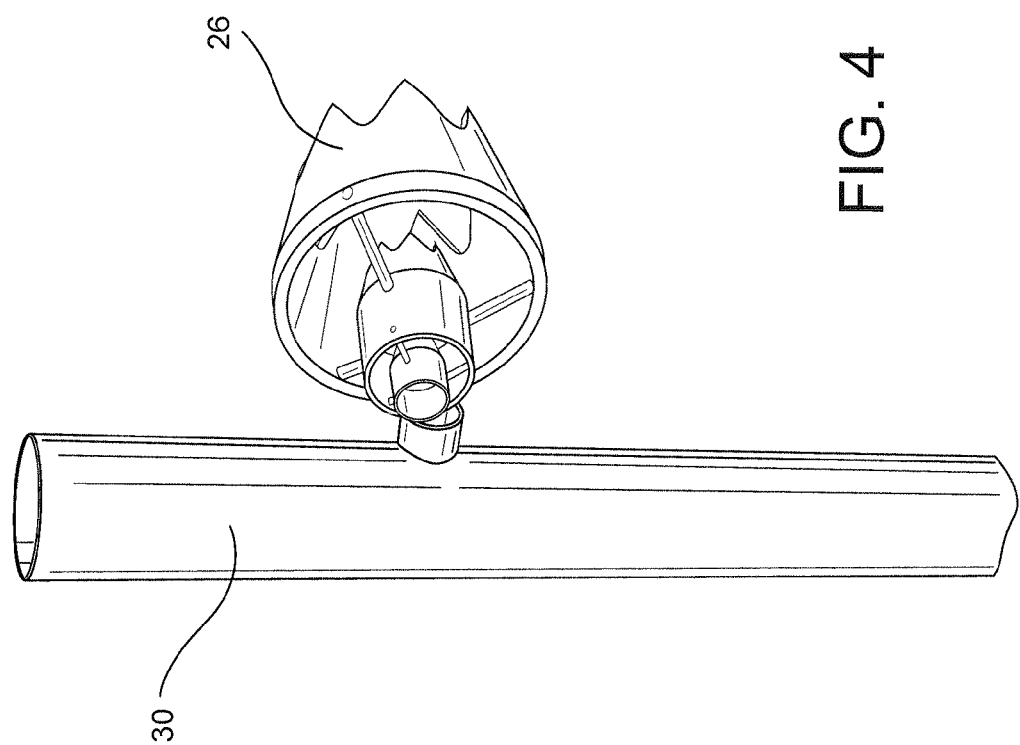
FIG. 4 is a detailed view of one branch from the inlet bleed heat manifold including an exemplary nozzle.

An output end of the inlet bleed heat manifold 18 includes a plurality of acoustic dispersion nozzles 26. The nozzles 26 serve to reduce a velocity of the compressor discharge air in the inlet bleed heat manifold 18 by mixing the compressor discharge air with outside air from the inlet filter housing 20. FIG. 2 shows the output end of the inlet bleed heat manifold 18 positioned between the inlet filter housing 20 and the inlet silencer 22. With reference to FIGS. 2 and 3, the inlet bleed heat manifold 18 includes a main manifold 28 and a plurality of branch manifolds 30 connected to the main manifold 28. The acoustic dispersion nozzles 26 are disposed on the branch manifolds 30. FIG. 4 is a close-up view of a branch manifold 30 and an exemplary nozzle 26. Those of ordinary skill in the art will appreciate alternative suitable designs for the nozzle 26, and the invention is not meant to be limited to the exemplary nozzle illustrated in FIG. 4.

The described system incorporates an ejector/mixer noise reduction nozzle to enhance the mixing of hot air in the turbine without the use of expensive components. By mixing the compressor discharge air with outside air from the inlet filter housing in the ejector/mixer nozzles, a velocity of the compressor discharge air in the inlet bleed heat manifold can be reduced, thereby reducing noise.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An inlet bleed heat system in a gas turbine comprising:
a compressor discharge extraction manifold that extracts compressor discharge air;
an inlet bleed heat manifold receiving the compressor discharge air;
an inlet filter housing disposed upstream of the inlet bleed heat manifold;
an inlet silencer disposed downstream of the inlet bleed heat manifold; and
a plurality of acoustic dispersion nozzles disposed at an output end of the inlet bleed heat manifold and between the inlet filter housing and the inlet silencer, the acoustic dispersion nozzles reducing a velocity of the compressor discharge air in the inlet bleed heat manifold by mixing the compressor discharge air with outside air from the inlet filter housing.

2. An inlet bleed heat system according to claim 1, wherein the plurality of acoustic dispersion nozzles comprise ejector/mixer noise reduction nozzles.

3. An inlet bleed heat system according to claim 1, wherein the inlet bleed heat manifold comprises a main manifold and a plurality of branch manifolds connected to the main manifold, and wherein the plurality of acoustic dispersion nozzles are disposed on the branch manifolds.

4. An inlet bleed heat system in a gas turbine comprising:
a compressor discharge extraction manifold that extracts compressor discharge air;
an inlet bleed heat manifold receiving the compressor discharge air; and
a plurality of acoustic dispersion nozzles disposed at an output end of the inlet bleed heat manifold, the plurality of acoustic dispersion nozzles reducing a velocity of the compressor discharge air in the inlet bleed heat manifold by mixing the compressor discharge air with outside air via an inlet filter housing, the plurality of acoustic dispersion nozzles being disposed between the inlet filter housing and an inlet silencer.

5. An inlet bleed heat system according to claim 4, wherein the plurality of acoustic dispersion nozzles comprise ejector/mixer noise reduction nozzles.

6. An inlet bleed heat system according to claim 4, wherein the inlet bleed heat manifold comprises a main manifold and a plurality of branch manifolds connected to the main manifold, and wherein the plurality of acoustic dispersion nozzles are disposed on the branch manifolds.

7. A method for reducing noise in an inlet bleed heat system of a gas turbine, the method comprising:
extracting compressor discharge air;
directing the compressor discharge air into an inlet bleed heat manifold; and
reducing a velocity of the compressor discharge air in the inlet bleed heat manifold by mixing the compressor discharge air with outside air via an inlet filter housing, wherein the reducing step comprises exhausting the inlet bleed heat manifold through a plurality of acoustic dispersion nozzles disposed at an output end of the inlet bleed heat manifold and between the inlet filter housing and an inlet silencer.

8. A method according to claim 7, wherein the inlet bleed heat manifold comprises a main manifold and a plurality of branch manifolds connected to the main manifold, and wherein the method comprises disposing the acoustic dispersion nozzles on the branch manifolds.

* * * * *